United States Patent

Kubo et al.

[11] Patent Number: 5,587,247
[45] Date of Patent: Dec. 24, 1996

[54] RESIN COMPOSITION FOR EXTRUSION MOLDING

[75] Inventors: Kohji Kubo; Shoichi Nezu; Fumio Ishibashi; Hiroyuki Harada; Yuji Shigematsu, all of Chiba, Japan

[73] Assignee: Sumitomo Chemical Company, Limited, Osaka, Japan

[21] Appl. No.: 350,074

[22] Filed: Nov. 29, 1994

[30] Foreign Application Priority Data

Nov. 29, 1993 [JP] Japan ..................................... 5-298276
May 23, 1994 [JP] Japan ..................................... 6-108183

[51] Int. Cl.⁶ ............................ C08L 23/08; C08L 23/04; B32B 27/32; C08K 5/00
[52] U.S. Cl. .......................... 428/523; 428/516; 428/513; 428/476.1; 428/461; 428/423.5; 525/240; 525/227; 525/222; 525/221; 524/128; 524/528; 524/522; 524/523
[58] Field of Search ...................................... 525/240, 227, 525/222, 221; 524/128; 428/516, 523

[56] References Cited

U.S. PATENT DOCUMENTS

| | | |
|---|---|---|
| 3,039,993 | 6/1962 | Friedman . |
| 4,187,212 | 2/1980 | Zinke et al. . |
| 4,877,663 | 10/1989 | Kambe et al. . |
| 5,006,398 | 4/1991 | Banerji . |
| 5,112,696 | 5/1992 | Roberts . |
| 5,358,792 | 10/1994 | Mehta et al. . |
| 5,376,439 | 12/1994 | Hodgson et al. . |
| 5,382,630 | 1/1995 | Stehling et al. . |

FOREIGN PATENT DOCUMENTS

| | | |
|---|---|---|
| 0575123 | 12/1993 | European Pat. Off. . |
| 57-174329 | 10/1982 | Japan . |
| 62-41529 | 10/1982 | Japan . |
| 62-053359 | 3/1987 | Japan . |

OTHER PUBLICATIONS

Exxon Chemical–Polyolefin Modification with Exact™ Plastomers–pp. 1–9–Feb. 1993–Presented at SPERETEC Polyolefins Conference.
"Structure 1 Property Relationships in Exxpol™ Polymers" Speed et al–SPE Conference–Feb. 1991 pp. 45–66.
Database WPI, Section Ch, Week 8739, Derwent Publ. Ltd., Class A17, AN 8205190J & JP–A–57 174 329 Sep. 1987 *abstract*.

*Primary Examiner*—Carman J. Seccuro, Jr.
*Attorney, Agent, or Firm*—Sughrue, Mion, Zinn, Macpeak & Seas

[57] ABSTRACT

A resin composition for extrusion molding which has a melt flow rate (MFR) of from 0.5 to 30 g/10 min., having (A) 1 to 80 parts by weight of an ethylenic polymer which gives an endothermic peak in a temperature range of from 80° to 120° C. in a temperature rise thermogram as measured by a differential scanning calorimeter, has a melt flow rate (MFR) of from 0.5 to 50 g/10 min., and is prepared by high-pressure radical polymerization, (B) 5 to 80 parts by weight of a copolymer of ethylene and an α-olefine containing 3 to 12 carbon atoms which gives at least one endothermic peak in a temperature range of from 110° to 130° C. in the temperature rise thermogram as described above, has a melt flow rate (MFR) of from 0.5 to 30 g/10 min. and a density of from 0.900 to 0.935 g/cm³ and (C) 5 to 70 parts by weight of the copolymer of ethylene and an α-olefin containing 3 to 12 carbon atoms which has a melt flow rate (MFR) of from 0.5 to 30 g/10 min. and a density of from 0.870 to 0.920 g/cm³ in an unannealed state, and gives no endothermic peak at temperatures above 110° C. in the temperature rise thermogram as described above, and in which a ratio of a main component is not less than 80%; which gives a packaging material having significantly improved properties such as heat sealability at low temperature, heat-sealing strength, hot tacking property and bag breaking strength, and exhibits an excellent extrusion processability such as film forming property and extrusion loading.

6 Claims, No Drawings

RESIN COMPOSITION FOR EXTRUSION MOLDING

BACKGROUND OF THE INVENTION

1. Field of the Invention

The present invention relates to a resin composition for extrusion molding. More particularly, it relates to a resin composition for extrusion molding which is used for extrusion molding of a packaging film or sheet.

2. Description of the Related Art

Polyolefin resins such as low density polyethylenes, ethylene-vinyl acetate copolymers, ionomers, etc., can be heat sealed at relatively low temperatures and have high heat-sealing strength. Therefore, they are often used as a heat sealing layer in a packaging film in the form of a mono layer or a multi-layer with other thin film material. The laminated films are usually prepared by a process such as co-extrusion, co-extrusion coating, dry laminating, etc.

Recently, high speed packaging is increasingly required in an automatic packaging system. The high speed packaging means that heat sealing is completed in a short time, and a period of time from the heat sealing to the application of a weight of a content in a bag to the heat-sealed portion is shortened. For this purpose, there is required a film in which heat-sealing properties can be developed at a low temperature and no peeling at the sealed portion occurs even if the weight of the content is applied to the sealed portion when it remains hot immediately after heat sealing, that is, a film having excellent hot tacking properties.

In laminated films, the heat sealing properties and the hot tacking properties depend to a large extent on the resin used for formation of a heat sealing layer while selection of a substrate film is also important.

Among the polyolefin resins, the ethylene-vinyl acetate copolymer is widely used as the heat sealing layer since it exhibits excellent heat sealability at low temperature in comparison with the low density polyethylene or the ionomers. However, it is poor in hot tacking properties and not satisfactory in heat-sealing strength.

Japanese Patent Kokoku No. 41529/1987 describes that, when a resin composition for extrusion molding comprising (a) a low density polyethylene, (b) an ethylene-α-olefin copolymer and (c) a low crystalline to non-crystalline ethylene-α-olefin copolymer is used as a heat sealing layer, it satisfies the properties required for the heat sealing layer in packaging materials, for example, heat sealability at low temperature, heat-sealing strength, hot tacking, strength in bag breaking. However, concerning heat-sealing strength, hot tacking and strength in bag breaking, it does not sufficiently satisfy the recent requirement for the heat sealing layer.

SUMMARY OF THE INVENTION

It is an object of the present invention to provide a resin composition which gives excellent properties required for packaging materials such as heat sealability at low temperature, heat-sealing strength, hot tacking property and bag breaking strength, as well as excellent extrusion processing characteristics such as film-forming properties and extrusion loading, and is hence suitable for use as a heat sealing layer in packaging films, particularly food packaging films.

The present invention provides a resin composition for extrusion molding which exhibits a melt flow rate (MFR) of from 0.5 to 30 g/10 min., comprising (A) 1 to 80 parts by weight, preferably 10 to 60 parts by weight, more preferably 20 to 40 parts by weight of an ethylenic polymer which gives an endothermic peak in a temperature range of 80° to 120° C. in a temperature rise thermogram as measured by a differential scanning calorimeter, has a melt flow rate (MFR) of from 0.5 to 50 g/10 min., and is prepared by high-pressure radical polymerization, (B) 5 to 80 parts by weight, preferably 10 to 70 parts by weight, more preferably 15 to 60 parts by weight of a copolymer of ethylene and an α-olefin containing 3 to 12 carbon atoms which gives at least one endothermic peak in a temperature range of from 110° to 130° C. in a temperature rise thermogram as measured by a differential scanning calorimeter, has a melt flow rate (MFR) of from 0.5 to 30 g/10 min. and a density of from 0.900 to 0.935 g/cm$^3$, and (C) 5 to 70 parts by weight, preferably 10 to 70 parts by weight, more preferably 20 to 70 parts by weight of a copolymer of ethylene and an α-olefin containing 3 to 12 carbon atoms which has a melt flow rate (MFR) of from 0.5 to 30 g/10 min. and a density of from 0.870 to 0.920 g/cm$^3$ in an unannealed state, and gives no endothermic peak at temperatures above 110° C. in a temperature rise thermogram as measured by a differential scanning calorimeter, and in which a ratio of a main component is given by the formula:

$C_w$ (%)=(parts by weight of components which are dissolved in a solvent at solvent temperatures between $T_L$ and $T_H$)×100 / (parts by weight of components which are dissolved in a solvent at solvent temperatures up to 120° C.) wherein $T_L$ (°C.)=$T_A$−{−4.61×σ$^2$×log (0.0125×σ)}$^{1/2}$−6.15×log (MFR)+1), and $T_H$ (°C.)=$T_A$−{−4.61×σ$^2$×log (0.0125×σ)}$^{1/2}$, wherein $T_A$=−5028×d$^2$+10481×d−5303, and σ=525.9×d$^2$−1096.3×d+565.6, in which d is a density as measured in an unannealed state (g/$^3$), and o-dichlorobenzene (ODCB) is used as a solvent is not less than 80%, the total amount of the components (A), (B) and (C) being 100 parts by weight.

DETAILED DESCRIPTION OF THE INVENTION

The ethylenic polymer of the component (A) gives the endothermic peaks in a temperature range of from 80° to 120° C., preferably from 90° to 120° C., more preferably from 100° to 115° C. in a temperature rise thermogram as measured by a differential scanning calorimeter. The endothermic peak temperature by a differential scanning calorimeter is a temperature at which a single or several endothermic peaks is or are observed in an endothermic curve obtained by measuring a heat of fusion according to JIS K7122 at a temperature rise rate of 5° C./min which is described in Section 3-(2) of JIS K7121. The measurement is carried out using a Perkin Ermer, type 7 DSC instrument. When the endothermic peak temperature is lower than 80° C., the resin has a poor heat stability and a film obtained therefrom is sticky on a surface. When it is higher than 120° C., sealability at low temperature tends to be deteriorated.

A melt flow rate (MFR) of the component (A) is from 0.5 to 50 g/10 min., preferably from 0.5 to 30 g/10 min. The MFR is measured at 190° C. under a load of 2.16 kg according to JIS K7210. When the MFR of the component (A) is less than 0.5 g/10 min. or more than 50 g/10 min., film-forming property is undesirably lowered.

A swelling ratio (SR) of the component (A) is usually from 1.30 to 2.00, preferably from 1.40 to 1.90. A strand obtained during the MFR measurement is used for SR, measurement and SR is calculated from the following equation:

SR=diameter of strand (mm)/internal diameter of orifice (mm)

A density of the component (A) is preferably from 0.910 to 0.940 g/cm$^3$.

The ethylenic polymers of the component (A) include low density polyethylene and copolymers of ethylene and at least one comonomer. They may be prepared by high pressure radical polymerization using oxygen, organic peroxides, azo compounds, acetoxime, amine acid compound, etc as an initiator.

Examples of the comonomer used are unsaturated carboxylic acids such as acrylic acid, methacrylic acid, maleic acid, etc.; esters of unsaturated carboxylic acids containing 4 to 8 carbon atoms such as methyl acrylate, ethyl acrylate, n-propyl acrylate, isopropyl acrylate, n-butyl acrylate, tert.-butyl acrylate, isobutyl acrylate, methyl methacrylate, ethyl methacrylate, n-propyl methacrylate, isopropyl methacrylate, n-butyl methacrylate, tert.-butyl methacrylate, isobutyl methacrylate, etc.; vinyl esters such as vinyl acetate, etc. and admixture thereof. The content of the comonomer in the copolymer is usually from 0 to 20% by weight. In the case of esters of the unsaturated carboxylic acids, it is usually from 0 to 25% by weight.

Examples of the ethylenic polymer of the component (A) are low density polyethylene; copolymers of ethylene with a comonomer such as ethylene-acrylic acid copolymer, ethylene-methacrylic acid copolymer, ethylene-methyl acrylate copolymer, ethylene-ethyl acrylate copolymer, ethylene-n-propyl acrylate copolymer, ethylene-isopropyl acrylate copolymer, ethylene-n-butyl acrylate copolymer, ethylene-tert.-butyl acrylate copolymer, ethylene-isobutyl acrylate copolymer, ethylene-methyl methacrylate copolymer, ethylene-ethyl methacrylate copolymer, ethylene-n-propyl methacrylate copolymer, ethylene-isopropyl methacrylate copolymer, ethylene-n-butyl methacrylate copolymer, ethylene-tert.-butyl methacrylate copolymer, ethylene-isobutyl methacrylate copolymer, ethylene-vinyl acetate copolymer, etc.; copolymers of ethylene with at least two comonomers such as ethylene-acrylic acid-ethyl acrylate copolymer, ethylene-acrylic acid-methyl acrylate copolymer, ethylene-acrylic acid-ethyl methacrylate copolymer, ethylene-acrylic acid-methyl methacrylate copolymer, ethylene-acrylic acid-vinyl acetate copolymer, ethylene-methacrylic acid-ethyl acrylate copolymer, ethylene-methacrylic acid-methyl acrylate copolymer, ethylene-methacrylic acid-ethyl methacrylate copolymer, ethylene-methacrylic acid-methyl methacrylate copolymer, ethylene-methacrylic acid-vinyl acetate copolymer, ethylene-ethyl acrylate-methyl acrylate copolymer, ethylene-ethyl methacrylate-methyl acrylate copolymer, ethylene-vinyl acetate-methyl acrylate copolymer, etc. Not only a single ethylenic copolymer but also a mixture of at least two ethylenic copolymers may be used as the component (A).

The component (B) used according to the present invention is a random copolymer of ethylene and α-olefin containing 3 to 12, preferably 4 to 12, more preferably 6 to 8 carbon atoms. The α-olefin may be used in admixture. Examples of the α-olefin are butene-1, pentene-1, hexene-1, heptene-1, octene-1, nonene-1, decene-1, 4-methylpentene-1, 4-methylhexene-1, 4,4-dimethylpentene-1, etc. Of these α-olefins, hexene-1, octene-1 and 4-methylpentene-1 are preferred in views of their easily commercially availability, copolymerization behavior and the quality of the copolymer obtained therefrom. The content of the α-olefin in the random copolymer is usually in the range of from 2.0 to 8.0 mole %.

The component (B) is required to give at least one endothermic peak in a temperature range of from 110° to 130° C. in a temperature rise thermogram as measured by a differential scanning calorimeter. The endothermic peak temperature is measured as described above.

If no endothermic peak is observed in the above temperature range, hot tacking properties are undesirably lowered when heat sealing is carried out at high temperature.

The component (B) preferably has a heat of fusion above 110° C. of not less than 20 J/g as determined from the endothermic curve.

A melt flow rate (MFR) of the component (B) is from 0.5 to 30 g/10 min., preferably from 0.5 to 20 g/10 min. The MFR is measured at 190° C. under a load of 2.16 kg according to JIS K7210. When it is less than 0.5 g/10 min., extrusion loading is undesirably increased. When it is more than 30 g/10 min., sufficient heat-sealing strength cannot be attained.

The density of the component (B) is measured after it is annealed at 100° C. for 1 hour according to JIS K6760. The density is from 0.900 to 0.935 g/cm$^3$, preferably from 0.910 to 0.930 g/cm$^3$, more preferably from 0.910 to 0.925 g/cm$^3$. When it is less than 0.900 g/cm$^3$, hot tacking properties are not sufficiently developed when heat sealing is carried out at high temperatures. When it exceeds 0.935 g/cm$^3$, heat sealability at low temperature is not developed undesirably.

The ethylene-α-olefin copolymer of the component (B) used in the present invention is usually prepared by copolymerizing ethylene and an α-olefin via ion polymerization in the presence of a catalyst which comprises a solid catalyst component comprising a transition metal and an organic aluminum compound at a temperature of from 30° to 300° C. under from normal pressure to 3000 kg/cm$^2$ in the presence or absence of a solvent in a gas-solid phase, liquid-solid phase, or homogeneous liquid phase. Examples of the solid catalyst component comprising a transition metal are chromium oxide, molybdenum oxide, titanium compounds such as titanium trichloride, titanium tetrachloride-alkyl aluminum, titanium tetrachloride, magnesium compounds such as magnesium chloride, alkyl aluminum chloride, etc.

The component (C) used according to the present invention is a random copolymer of ethylene and an α-olefin containing 3 to 12, preferably 4 to 10, more preferably 6 to 8 carbon atoms. The α-olefin may be used in admixture. Examples of the α-olefin are hexene-1, heptene-1, octene-1, 4-methylpentene-1, 4-methylhexene-1, 4,4-dimethylpentene-1, etc. When the carbon numbers of α-olefin is less than 3, excellent hot tacking properties and high bag breaking strength, which are the characteristic features of the present invention, are not achieved. The content of α-olefin in the random copolymer is usually from 2.0 to 15 mole %.

A melt flow rate (MFR) of the component (C) is from 0.5 to 30 g/10 min, preferably 0.5 to 20 g/10 min. The MFR is measured at 190° C. under a load of 2.16 kg according to JIS K7210. When the MFR of the component (C) is less than 0.5 g/10 min., extrusion loading is undesirably high. When it exceeds 30 g/10 min., sufficient heat-sealing strength cannot be obtained.

The component (C) is required to give no endothermic peak at a temperature of not lower than 110° C. in a temperature rise thermogram as measured by a differential scanning calorimeter. The temperature rise thermogram is measured in the same manner as described above.

The density of the component (C) is measured without annealing treatment thereof according to JIS K6760. It is from 0.870 to 0.920 g/cm$^3$, preferably from 0.880 to 0.920 g/cm$^3$, more preferably from 0.890 to 0.915 g/cm$^3$. When it is less than 0.870 g/cm$^3$, the film obtained is sticky and tends to cause blocking. When it exceeds 0.920 g/cm$^3$, heat sealability at low temperature, which is a characteristic feature of the present invention, is not undesirably achieved. A copolymer of ethylene and α-olefin containing 3 to 5 carbon atoms which has a density of 0.900 to 0.920 g/cm$^3$ is also preferred as the component (C) used in the present invention. The component (C) has a ratio of a main component in the copolymer, which is given in Equation (1) below, of not less than 80%, preferably not less than 85%, more preferably not less than 90%.

$C_w$ (%)=(parts by weight of components which are dissolved in a solvent at solvent temperatures between $T_L$ and $T_H$)×100 / (parts by weight of components which are dissolved in a solvent at solvent temperatures up to 120° C.) (1) wherein $T_L$ (°C.)=$T_A$−{−4.61×σ$^2$×log (0.0125×σ)}$^{1/2}$−6.15×(log (MFR)+1), and $T_H$ (°C.)=$T_A$−{−4.61×σ$^2$×log (0.0125×σ)}$^{1/2}$, wherein $T_A$=−5028×d$^2$+10481×d−5303, and σ=525.9×d$^2$−1096.3×d+565.6, in which d is a density as measured in an unannealed state (g/cm$^3$), and o-dichlorobenzene (ODCB) is used as a solvent.

The intensive studies have been made to improve heat sealability at low temperature, hot tacking properties and bag breaking strength, etc. and it has been found that there is an appropriate composition of a specific component according to the density of the component (C). The ratio of the specific component in the whole component (C) is defined by $C_w$. When $C_w$ is less than 80%, improved properties such as heat sealability at low temperature, hot tacking property and high bag breaking strength cannot be achieved.

$C_w$ can be determined by the following component separation process of the component (C): Into a cylindrical column in which a sea sand (50 to 80 meshes, commercially available from Yoneyama Chemicals Industry) is packed using o-dichlorobenzene (ODCB), an ODCB solution dissolving about 2 g of an ethylene-α-olefin copolymer is introduced while keeping it at 145° C. and the column is allowed to stand. Then the column is cooled to −15° C. at a cooling rate of 15° C./hr. to support the copolymer on the sea sand. Thereafter the column temperature is increased to $T_L$ and an ODCB solvent having the same temperature as $T_L$ is introduced into the column. The solvent is flowed through the column while dissolving a portion of the ethylene-α-olefin copolymer to give a solution in which the portion of the ethylene-α-olefin copolymer is dissolved. The solution is removed from the column. Following the procedure, the same procedure is repeated after the column temperature is increased to $T_H$. Thereafter, the same procedure is one more time repeated after the column temperature is raised to 120° C.

The solutions dissolving the ethylene-α-olefin copolymer are poured into methanol, respectively to precipitate the components in the copolymer. The precipitated component is then filtrated and dried. The weight thereof is then measured and $C_w$ is calculated using Equation (1). The weight of the components which are dissolved and isolated at solvent temperatures between $T_L$ and $T_H$ corresponds to the weight of the ethylene-α-olefin copolymer isolated during the second isolation procedure. The weight of the components which are dissolved and isolated at solvent temperatures up to 120° C. is preferably not less than 97% by weight of the total weight of the ethylene-α-olefin copolymer which is introduced in the column.

The ethylene-α-olefin copolymer of the component (C) used in the present invention has a cooled-xylene soluble portion (CXS) of preferably not more than 30% by weight, more preferably not more than 15% by weight, most preferably not more than 8% by weight.

The cooled-xylene soluble portion is determined according to a method for measuring a maximum amount dissolved in xylene as described in FDA, §177.1520, the disclosure of which is herein incorporated by reference. Specifically, 5±0.001 g of a resin is heated under reflux in 1000 ml of xylene for 2 hours and then cooled to 25°±0.5° C., followed by standing at the same temperature for at least 3 hours. Thereafter, the mixture is spontaneously filtrated using a filter paper to obtain a filtrate. Not less than 700 ml of the filtrate is concentrated to obtain a concentrate. The concentrate is dried at 100° C. for 60 minutes under a reduced pressure to obtain an extract. The extract is allowed to be left in a desiccator overnight and then weighed. The cooled-xylene soluble portion (CXS) is calculated by the following equation:

CXS (% by weight)=[weight of extracted cooled-xylene soluble portion (g)×1000]×100 / [weight of sample used (g) x amount of filtrate taken (ml)].

When CXS exceeds 30% by weight, stickiness and blocking of obtained film surfaces tend to occur The component (C) has preferably a molecular weight distribution of not more than 3.5 as measured by gel permeation chromatography (GPC), which is carried out at 145° C. using a Type 150C gel permeation chromatography instrument (commercially available from Waters), GMH6-HT (commercially available from Toso) as a column and o-dichlorobenzene as a solvent.

The ethylene-α-olefin copolymer of the component (C) used in the present invention is usually prepared by copolymerizing ethylene and α-olefin via ion polymerization in the presence of a Ziegler catalyst or a metallocene catalyst at a temperature of from 30° to 300° C. under from normal pressure to 3000 kg/cm$^2$ in the presence or absence of a solvent in a gas-solid phase, liquid-solid phase or homogeneous liquid phase. An example of the Ziegler catalyst is a composite catalyst of a vanadium compound such as vanadium trichloride, vanadium tetrachloride, etc. and an organic aluminum compounds. An example of the metallocene catalyst is a composite catalyst of a transition metal compound containing a ligand having a cycloalkadienyl skeleton and an organic aluminum oxy compound.

The resin composition for extrusion molding according to the present invention can be prepared by melting and mixing homogeneously 1 to 80 parts by weight, preferably 10 to 60 parts by weight, more preferably 20 to 40 parts by weight of the ethylenic polymer (A), 5 to 80 parts by weight, preferably 10 to 70 parts by weight, more preferably 15 to 60 parts by weight of the ethylene-α-olefin random copolymer (B) and 5 to 70 parts by weight, preferably 10 to 70 parts by weight, more preferably 20 to 70 parts by weight of the ethylene-α-olefin copolymer (C), the sum of the components (A), (B) and (C) being 100 parts by weight.

When the content of the component (A) is less than 1 parts by weight, a melted film of the resin composition is unstable during extrusion molding, resulting in fluctuation of the film obtained in width and thickness. On the other hand, the content exceeding 80 parts by weight leads to an undesirable balance among heat-sealing strength, hot tacking properties and bag breaking strength, which are characteristic features of the present invention.

When the content of the component (B) is less than 5 parts by weight, high heat-sealing strength and bag breaking strength are not obtained. When it is more than 80 parts by weight, resin pressure during extrusion molding is increased or the melted film extruded from a die has a low melt tension, resulting in decreased film-forming stability.

When the content of the component (C) is less than 5 parts by weight, heat sealability at low temperature, high heat-sealing strength and bag breaking strength are not obtained. When it exceeds 70 parts by weight, the resin pressure is increased during extrusion molding and hence a load on a motor is excessive.

The resin composition according to the present invention has a MFR of from 0.5 to 30 g/10 min, preferably from 0.8 to 20 g/10 min, more preferably from 1 to 15 g/10 min. When it is less than 0.5 g/10 min, the resin pressure in a extruder is increased during extrusion molding and breakage of film tends to occur during film forming. When it is more than 30 g/10 min, heat-sealing strength and bag breaking strength are decreased and problems are likely to take place in film-forming. The MFR is determined at 190° C. under a load of 2.16 kg according to JIS K7210.

The resin composition according to the present invention may optionally comprises 0.01 to 0.5 part by weight of thermal stabilizers (D) comprising a phenolic thermal stabilizer and a phosphite thermal stabilizer and not more than 0.5 part by weight of a slip agent (E), per 100 parts by weight of the sum of the components (A), (B) and (C).

When the content of the component (D) is less than 0.01 part by weight, heat deterioration of the resin composition may occur during film forming. When it exceeds 0.5 part by weight, problems such as blocking and coloring of the film obtained may be caused.

When the content of the component (E) exceeds 0.5 part by weight, the film obtained is not only excessively slipped, but also has poor printing properties and heat-sealing properties.

Examples of the phenolic thermal stabilizer in the component (D) are 2,6-di-tert.-butyl-p-cresol (BHT), tetrakis [methylene-3-(3,5-di-tert.-butyl-4-hydroxyphenyl) propionate]methane (IRGANOX 1010), n-octadecyl-3-(4'-hydroxy-3,5'-di-tert.-butylphenyl) propionate and stearyl-β-(3,5-tert.-butyl-4-hydroxyphenyl) propionate (IRGANOX 1076). Among them, stearyl-β-(3,5-tert.-butyl-4-hydroxyphenyl) propionate is preferred.

Examples of the phosphite thermal stabilizer in the component (D) are triphenyl phosphite, trioctadecyl phosphite, tridecyl phosphite, distearyl pentaerythryltol diphosphite, 4,4'-bisphenylene diphosphine acid tetrakis(2,4-di-tert.-butylphenyl), bis(2,4-di-tert.butylphenyl)pentaerythtol diphosphite, and tris(2,4-di-tert.-butyphenyl) phosphite. Among them, tris(2,4-di-tert.-butylphenyl) phosphite is preferred.

The ratio of the phenolic thermal stabilizer to the phosphite thermal stabilizer is from 80:20 to 25:75 by weight, preferably from 60:40 to 30:70 by weight.

The slip agent used in the present invention is not particularly limited. However, it preferably has a melting peak temperature of not less than 80° C. The method for measuring the melting peak temperature is the same as described above in connection with the Component (A).

Examples of the slip agent of the component (E) are higher fatty acids such as behenic acid (a melting peak temperature: 80° C.); metal salts such as aluminum, calcium, magnesium, etc. of fatty acids, for example, magnesium palmitate (a melting peak temperature: 129° C.), calcium stearate (a melting peak temperature: 145° C.), zinc stearate (a melting peak temperature: 140° C.); amides of fatty acids having 16 to 22 carbon atoms such as erucyl amide (a melting peak temperature: 84° C.), stearyl amide (a melting peak temperature: 103° C.), behenyl amide (a melting peak temperature: 110° C.); esters of stearic acid with an saturated alcohols, etc. Of these, erucyl amide, etc. are preferred.

The resin composition according to the present invention may optionally comprise anti-blocking agents, antistatic agents, etc. The examples of the anti-blocking agent are silica, calcium carbonate, talc, etc. Examples of the antistatic agent are glycerine esters of fatty acids having 8 to 22 carbon atoms, sorbitan esters, sucrose esters, polyethylene glycol esters, etc.

The resin composition of according to the present invention can be prepared by melting and mixing simultaneously or successively the components of the resin composition using a single screw extruder, a twin screw extruder, a Banbury mixer, a kneader of various kinds, etc.

The resin composition according to the present invention has excellent extrusion molding properties and satisfies the characteristics required as the heat sealing layer.

The resin composition according to the present invention can be extrusion laminated on a composite film, sheet, aluminum foil, cellophane, paper, etc. alone or together with another resin to form a laminated film or sheet.

The resin composition according to the present invention is mainly used in a packaging material for foods, medicines, industrial products, miscellaneous goods. The various kinds of the laminated film or sheet, in which the resin composition according to the present invention is utilized as a heat sealing layer making the most of the characteristic features thereof, can be advantageously used for packaging various kinds of food such as dried food, e.g., cakes, snacks, powdered seasoning, powdered soup and the like; meat products, e.g., ham, sausage, and the like; water containing foods, e.g., konjak (jelly), pickled vegetables, soybean paste, liquid soup and the like; liquid cleaner, liquid medicine, etc.

EXAMPLES

The present invention will be illustrated in detail by Examples hereinafter, but is not limited thereto.

EXAMPLE 1

Thirty parts by weight of a low density polyethylene (a density: 0.919 g/cm$^3$, MFR: 9 g/10 min., SR: 1.80, the number of endothermic peak: 1, an endothermic peak temperature: 105° C.) (Component (A)), 30 parts by weight of an ethylene-hexene-1 random copolymer (MFR: 12 g/10 min., a density: 0.912 g/cm$^3$, the number of endothermic peak: 3, endothermic peak temperatures: 101° C., 118° C. and 122° C., a melting heat amount above 110° C.: 28 J/g, a hexene-1 content: 4.8 mole %) (Component(B)), 40 parts by weight of an ethylene-hexene-1 copolymer (MFR: 12 g/10 min, a density (unannealed): 0.903 g/cm$^3$, an endothermic peak above 110° C.: none, C$_w$: 93%, a hexene-1 content: 5.6 mole %, a molecular weight distribution: 2.2, CXS: 2% by weight) (Component (C)), 0.20 part by weight of stearyl-β-(3,5-tert.-butyl-4-hydroxyphenyl) propionate (a phenolic thermal stabilizer of Component (D)), 0.16 part by weight of tris(2,4-di-tert.-butylphenyl) phosphite (a phosphite thermal stabilizer of Component (D)) and 0.1 part by weight of erucyl amide (a slip agent of Component (E)) were kneaded and extruded at 150° C. using a single screw extruder to obtain pellets. The resin composition which was mixed and melted homogeneously had a MFR of 10 g/10 min.

On a substrate of biaxially oriented nylon film having a thickness of 15 μm (Emblem ON, commercially available from Unitika) an anchor coating agent of a polyurethane (T120, T300, commercially available from Nippon Soda) was coated. Then a resin of a low density polyethylene (MFR: 7 g/10 min, a density: 0.918 g/cm$^3$, SUMIKATHENE L705 commercially available from Sumitomo Chemical Company) which had been melted and kneaded at a resin temperature of 310° C. and the above resin composition which had been melted and kneaded at a resin temperature of 290° C. were extrusion laminated in this order on the substrate in thicknesses of 20 μm and 40 μm, respectively, to obtain a laminated film for evaluation.

The extrusion lamination was effected at a processing speed of 80 m/min using a 65 mmφ co-extrusion laminator (commercially available from Sumitomo Heavy Industries) having a multi-slot type T-die in which cooling rolls were equipped with semimat rolls (25° C.).

A neck-in which represents a difference between a width of an aperture of the die and that of the laminated resin film was 110 mm in the sum of both sides. A resin pressure which represents a loading in the extruder was 169 kg/cm$^2$.

The laminated film thus obtained was evaluated according to the following measuring method:

(1) Heat Sealing Properties

A pair of the films, sealant layers of which face to each other, are heat sealed under conditions of a sealing surface pressure of 1.0 kg/cm$^2$, a sealing period of 1.0 sec and a sealed width of 10 mm using a heat sealer (commercially available from Tester Industries) in a direction perpendicular to that of the extrusion processing. The heat sealings are repeated changing seal bar temperature (heat sealing temperature) by 5° C. The heat sealed films is cut in a direction perpendicular to that of the sealed surface to obtain a sample of 15 mm in width. A 180° peel strength is measured at a speed of 200 mm/min using a Schopper tensile tester.

(a) Maximum Heat-sealing Strength

Maximum heat-sealing strength means the maximum value of the heat-sealing strength measured under the above described conditions (b) Heat Sealability At Low Temperature Heat sealability at low temperature means the minimum temperature at which the heat-sealing strength measured under the above described conditions exceeds 2 kg/15 mm width.

(2) Hot Tacking Properties

Sealant layers of the films each having a width of 15 mm obtained by cutting a laminated film in a direction parallel to that of extrusion processing are fitted to each other. Heat sealing is then effected under conditions of a sealing surface pressure of 1.3 kg/cm$^3$, a sealing period of 0.3 sec, and a sealed width of 20 mm using a heat sealer (commercially available from Tester Industries) while a load of 30 g or 25 g is applied at one end of the film. An adjustment is made so that a peeling power by the load is exerted on the sealed surface 0.14 second after the completion of the heat sealing, and a peeled distance by the peeling power is measured. Heat sealing tests are repeated changing seal bar temperature (heat sealing temperature) by 5° C.

(a) Minimum Peeled Distance

Minimum peeled distance is the minimum value of the peeled distance measured by the above described method.

(b) Hot Tacking Property At Low Temperature

Hot tacking property at low temperature is the minimum temperature at which the peeled distance measured by the above described method is not more than 5 mm. The case in which it is more than 5 mm is shown by the symbol "X" in Table 1.

(3) Heat-sealing Strength At High Temperature

A pair of the films, sealant layers of which face each other, are heat sealed under conditions of a sealing surface pressure of 1.0 kg/cm$^2$, a sealing period of 1.0 sec, a sealed width of 10 mm and a seal bar temperature of 170° C. using a heat sealer (commercially available from Tester Industries) in a direction perpendicular to that of the extrusion processing. The heat sealed films are cut in a direction perpendicular to that of the sealed surface to obtain a sample of 15 mm in width. 180° peel strength is measured at a peeling speed of 200 mm/min under an atmosphere of 80°±1° C. using a T-type storograph (commercially available from Toyo Seiki).

EXAMPLE 2

Example 1 was repeated to prepare a resin composition except that 40 parts by weight of an ethylene-hexene-1 copolymer (MFR: 11 g/10 min, a density (unannealed): 0.895 g/cm$^3$, an endothermic peak above 110° C.: none, $C_w$: 91%, a hexene-1 content: 7.2 mole %, a molecular weight distribution: 2.3, CXS: 4.5% by weight) was used as Component (C). The homogeneously mixed resin composition obtained had a MFR of 10 g/10 min.

Extrusion processing was effected under the same condition as in Example 1. A neck-in was found to be 114 mm and a resin pressure in the extruder to be 170 kg/cm$^2$. The test results on the laminated film obtained are given in Table 1.

COMPARATIVE EXAMPLE 1

Example 1 was repeated to prepare a resin composition except that 40 parts by weight of an ethylene-hexene-1 copolymer (MFR: 11 g/10 min, a density (unannealed): 0.909 g/cm$^3$, an endothermic peak above 110° C.: none, $C_w$: 46%, a hexene-1 content: 4.9 mole %, a molecular weight distribution: 3.5, CXS: 15% by weight) was used as Component (C). The homogeneously mixed resin composition obtained had a MFR of 11 g/10 min.

Extrusion processing was effected under the same condition as in Example 1. A neck-in was found to be 122 mm and a resin pressure in-the extruder to be 155 kg/cm$^2$. The test results on the laminated film obtained are given in Table 1.

COMPARATIVE EXAMPLE 2

Example 1 was repeated to prepare a resin composition except that Components (B) and (C) were not used, and 100 parts by weight of the low density polyethylene which was the same as used as Component (A) in Example 1 was used.

Extrusion processing was effected under the same condition as in Example 1. A neck-in was found to be 84 mm and a resin pressure in the extruder to be 138 kg/cm$^2$. The test results on the laminated film obtained are given in Table 1.

COMPARATIVE EXAMPLE 3

Example 1 was repeated to prepare a resin composition except that Components (B) and (C) were not used, and 100 parts by weight of an ethylene-vinyl acetate copolymer (MFR: 6 g/10 min, SR: 1.50, a melting peak temperature: 94.7° C., a vinyl acetate content: 10% by weight) was used as Component (A).

Extrusion processing was effected at a resin temperature of 260° C. A neck-in was found to be 82 mm and a resin pressure in the extruder to be 176 kg/cm$^2$. The test results on the laminated film obtained are given in Table 2.

COMPARATIVE EXAMPLE 4

Example 1 was repeated to prepare a resin composition except that Components (A) and (C) were not used, and 100 parts by weight of the ethylene-hexene random copolymer which was the same as used as Component (B) in Example 1 was used.

Extrusion processing was tried under the same condition as in Example 1. However, a resin pressure in the extruder was increased during the processing and a melted film extruded from T-dies was unstable, therefore laminated film having a definite thickness could not be prepared.

EXAMPLE 3

Example 1 was repeated to prepare a resin composition except that 40 parts by weight of an ethylene-butene-1 copolymer (MFR: 12 g/10 min, a density (unannealed): 0.902 g/cm$^3$, an endothermic peak above 110° C.: none, $C_w$: 92%, a butene-1 content-1: 6.0 mole %, a molecular weight distribution: 2.2, CXS: 2% by weight) was used as Component (C). The homogeneously mixed resin composition obtained had a MFR of 10 g/10 min.

Extrusion processing was effected under the same condition as in Example 1. A neck-in was found to be 115 mm and a resin pressure in the extruder to be 168 kg/cm$^2$. The test results on the laminated film obtained are given in Table 3.

EXAMPLE 4

Example 3 was repeated to prepare a resin composition except that the amounts of Component (A), Component (B) and Component (C), which were the same as used in Example 3, were 30 parts by weight, 60 parts by weight and 10 parts by weight, respectively. The homogeneously mixed resin composition obtained had a MFR of 9.6 g/10 min.

Extrusion processing was effected under the same condition as in Example 3. A neck-in was found to be 120 mm and a resin pressure in the extruder to be 175 kg/cm$^2$. The test results on the laminated film obtained are given in Table 3.

EXAMPLE 5

Example 3 was repeated to prepare a resin composition except that the amount of Component (A), Component (B) and Component (C), which were the same as used in Example 3, were 10 parts by weight, 70 parts by weight and 20 parts by weight, respectively. The homogeneously mixed resin composition obtained had a MFR of 9.7 g/10 min.

Extrusion processing was effected under the same condition as in Example 3. A neck-in was found to be 143 mm and a resin pressure in the extruder to be 186 kg/cm$^2$. The test results on the laminated film obtained are given in Table 3.

EXAMPLE 6

Example 3 was repeated to prepare a resin composition except that 30 parts by weight of an ethylene-methyl methacrylate copolymer (MFR: 7 g/10 min, SR: 1.63, a melting peak temperature: 93.7° C., a methyl methacrylate content: 15% by weight) was used as Component (A). The homogeneously mixed resin composition obtained had a MFR of 9.1 g/10 min.

Extrusion processing was effected under the same condition as in Example 3. A neck-in was found to be 120 mm and a resin pressure in the extruder to be 169 kg/cm$^2$. The test results on the laminated film obtained are given in Table 3.

COMPARATIVE EXAMPLE 5

Example 3 was repeated to prepare a resin composition except that Component (B) was not used, and that the amount of Components (A) and (C), which were the same as used in Example 3, were 70 parts by weight and 30 parts by weight, respectively. The homogeneously mixed resin composition obtained had a MFR of 9.0 g/10 min.

Extrusion processing was effected under the same condition as in Example 3. A neck-in was found to be 91 mm and a resin pressure in the extruder to be 145 kg/cm$^2$. The test results on the laminated film obtained are given in Table 4.

COMPARATIVE EXAMPLE 6

Example 3 was repeated to prepare a resin composition except that Components (A) and (B) were not used, and 100 parts by weight of the ethylene-butene-1 copolymer which was the same as used as Component (C) in Example 3 was used.

Extrusion processing was tried under the same condition as in Example 3. However, the resin pressure in the extruder was increased during the extrusion processing and a melted film extruded from T dies was unstable, therefore a laminated film having a definite thickness could not be prepared.

TABLE 1

|  | Example | | Comparative Example | |
| --- | --- | --- | --- | --- |
|  | 1 | 2 | 1 | 2 |
| Heat sealing properties | | | | |
| Maximum heat-sealing strength (kg/15 mm width) | 6.7 | 6.5 | 6.5 | 4.5 |
| Heat sealability at low temperature (°C.) | 110 | 105 | 125 | 120 |
| Hot tacking properties (The load = 30 g) | | | | |
| Minimum stripped distance (mm) | 1.0 | 1.0 | 1.0 | 16 |
| Hot tacking property | 115 | 110 | 125 | x |

TABLE 1-continued

|  | Example | | Comparative Example | |
|---|---|---|---|---|
|  | 1 | 2 | 1 | 2 |
| at low temperature (°C.) | | | — | |
| Sealing-strength at high temperature (kg/15 mm width) | 2.9 | 2.3 | 3.0 | 0.4 |
| Processability | | | | |
| Neck-in (mm) | 110 | 114 | 122 | 84 |
| Resin pressure in extruder (kg/cm²) | 169 | 170 | 155 | 138 |

TABLE 2

|  | Comparative Example | |
|---|---|---|
|  | 3 | 4 |
| Heat sealing properties | | |
| Maximum heat-sealing strength (kg/15 mm width) | 4.3 | — |
| Heat sealability at low temperature (°C.) | 110 | |
| Hot tacking properties (The load = 30 g) | | |
| Minimum stripped distance (mm) | 10 | |
| Hot tacking property at low temperature (°C.) | X | |
| Sealing-strength at high temperature (kg/15 mm width) | 0.3 | |
| Processability | | |
| Neck-in (mm) | 82 | (unprocessable) |
| Resin pressure in extruder (kg/cm²) | 176 | |

TABLE 3

|  | Example | | | |
|---|---|---|---|---|
|  | 3 | 4 | 5 | 6 |
| Heat sealing properties | | | | |
| Heat-sealing strength (kg/15 mm width) | 6.4 | 6.5 | 6.4 | 6.3 |
| Heat sealability at low temperature (°C.) | 115 | 120 | 115 | 110 |
| Hot tacking properties (The load = 25 g) | | | | |
| Minimum stripped distance (mm) | 1.5 | 1.0 | 1.0 | 2.0 |
| Hot tacking property at low temperature (°C.) | 120 | 120 | 120 | 115 |
| Sealing-strength at high temperature (kg/15 mm width) | 2.0 | 2.7 | 2.9 | 1.8 |
| Processability | | | | |
| Neck-in (mm) | 115 | 120 | 143 | 120 |
| Resin pressure in extruder (kg/cm²) | 168 | 175 | 186 | 169 |

TABLE 4

|  | Comparative Example | |
|---|---|---|
|  | 5 | 6 |
| Heat sealing properties | | |
| Heat-sealing strength (kg/15 mm width) | 5.0 | — |
| Heat sealability at low temperature (°C.) | 120 | — |
| Hot tacking properties (The load = 25 g) | | |
| Minimum stripped distance (mm) | 4.0 | — |
| Hot tacking property at low temperature (°C.) | 125 | — |
| Sealing-strength at high temperature (kg/15 mm width) | 0.9 | — |
| Processability | | |
| Neck-in (mm) | 91 | (unprocessable) |
| Resin pressure in extruder (kg/cm²) | 145 | |

As described above, the present invention provides a resin composition which gives a packaging material having significantly improved properties such as heat sealability at low temperature, heat sealing-strength, hot tacking properties and bag breaking strength, has an excellent extrusion processability such as film forming property and extrusion loading, and is therefore suitable for use as a heat sealing layer in packaging film, particularly for foods.

What is claimed is:

1. A resin composition for extrusion molding which has a melt flow rate (MFR) of from 0.5 to 30 g/10 min., comprising:

(A) 1 to 80 parts by weight of at least one polymer selected from the group consisting of low density polyethylene and copolymers of ethylene and at least one comonomer selected from the group consisting of unsaturated carboxylic acids, esters of unsaturated carboxylic acids containing 4 to 8 carbon atoms and vinyl esters, which gives an endothermic peak in a temperature range of from 80° to 120° C. in a temperature rise thermogram as measured by a differential scanning calorimeter, has a melt flow rate (MFR) of from 0.5 to 50 g/min., and is prepared by high-pressure radical polymerization, (B) 5 to 80 parts by weight of a copolymer of ethylene and an α-olefin containing 6 to 8 carbon atoms which gives at least one endothermic peak in a temperature range of from 118° to 130° C. in a temperature rise thermogram as measured by a differential scanning calorimeter, has a melt flow rate (MFR) of from 0.5 to 30 g/10 min., a density of from 0.900 to 0.935 g/cm³, and (C) 5 to 70 parts by weight of a copolymer of ethylene and an α-olefin containing 3 to 8 carbon atoms which has a melt flow rate (MFR) of from 0.5 to 30 g/10 min. and a density of from 0.902 to 0.920 g/cm³ in an unannealed state, gives no endothermic peak at temperatures above 110° C. in a temperature rise thermogram as measured by a differential scanning calorimeter, has a cooled-xylene portion which is not more than 30% by weight, and which has a ratio of a main component given by the formula:

$C_w$(%)=(parts by weight of components which are dissolved in a solvent at solvent temperatures between $T_L$ and $T_H$)×100/ (parts by weight of components which are dissolved in a solvent at solvent temperatures at 120° C.) wherein $T_L$ (°C.)=$T_A$−{−4.61×σ²×log (0.0125×σ)}$^{1/2}$−6.15×(log (MFR)+1), and $T_H$(°C.)=$T_A$−{−4.61×σ²×log (0.0125×σ)}$^{1/2}$, wherein $T_A$=−5028×d²+10481×d−5303, and σ=525.9×d²−1096.3×d+565.6, in which d is a density as measured in an unannealed state (g/cm³), and o-dichlorobenzene (ODCB) is used as a solvent, is not less than 80%, and the total quantity of (A), (B) and (C) being 100 parts by weight.

2. A resin composition for extrusion molding as claimed in claim 1 in which the component (A) is a low density polyethylene having a density of 0.910 to 0.940 g/cm³ which is prepared by high pressure radical polymerization.

3. A resin composition for extrusion molding as claimed in claim 1 in which the α-olefin in the component (C) has 6 to 8 carbon atoms.

4. A laminated film or sheet comprising a heat sealing layer which comprises a resin composition according to claim 1.

5. A resin composition for extrusion molding as claimed in claim 1, which further comprises 0.01 to 0.5 parts by weight of a thermal stabilizer comprising a phenolic thermal stabilizer and a phosphite thermal stabilizer.

6. A resin composition for extrusion molding as claimed in claim 1, which further comprises not more than 0.5 parts by weight of a slip agent.

\* \* \* \* \*